United States Patent
Vegas et al.

(10) Patent No.: US 12,034,695 B2
(45) Date of Patent: Jul. 9, 2024

(54) WIRELESS CLIENT MEDIA ACCESS CONTROL (MAC) ADDRESS COLLISION AVOIDANCE

(71) Applicant: Cisco Technology, Inc., San Jose, CA (US)

(72) Inventors: Thomas Vegas, Gland (CH); Anirban Karmakar, Ecublens Vaud (CH); Robert Barton, Richmond (CA); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 150 days.

(21) Appl. No.: 17/673,100

(22) Filed: Feb. 16, 2022

(65) Prior Publication Data

US 2023/0262023 A1   Aug. 17, 2023

(51) Int. Cl.
| | |
|---|---|
| H04L 61/2596 | (2022.01) |
| H04W 8/26 | (2009.01) |
| H04L 101/622 | (2022.01) |
| H04W 80/02 | (2009.01) |

(52) U.S. Cl.
CPC ......... *H04L 61/2596* (2013.01); *H04W 8/26* (2013.01); *H04L 2101/622* (2022.05); *H04W 80/02* (2013.01)

(58) Field of Classification Search
None
See application file for complete search history.

(56) References Cited

U.S. PATENT DOCUMENTS

| | | |
|---|---|---|
| 10,237,738 B2 | 3/2019 | Lee et al. |
| 10,454,887 B2 | 10/2019 | Weis et al. |
| 10,820,202 B1 | 10/2020 | Gundavelli |
| 2010/0110975 A1 | 5/2010 | Cagenius |

(Continued)

FOREIGN PATENT DOCUMENTS

| | | |
|---|---|---|
| WO | 2009156777 A1 | 12/2009 |
| WO | 2016/114843 A2 | 7/2016 |
| WO | 2020/010126 A1 | 9/2020 |

OTHER PUBLICATIONS

Ansley et al., "Proposal for New Action Frame to Aid Mac Randomization Handling," IEEE 802.11-19/0179r3, Jul. 2019, 9 pages.

(Continued)

*Primary Examiner* — Otis L Thompson, Jr.
(74) *Attorney, Agent, or Firm* — Edell, Shapiro & Finnan, LLC

(57) ABSTRACT

A first access point of a wireless network minimizes Media Access Control (MAC) address collisions in the wireless network. The first access point receives an association request from a first wireless device. The association request identifies a first MAC address of the first wireless device. The first access point determines whether a second wireless device is associated with the wireless network using the first MAC address. Responsive to a determination that the second wireless device is associated with a second access point of the wireless network, the first access point obtains a virtual MAC address for the first wireless device. The first access point translates between the first MAC address and the virtual MAC address for network traffic of the first wireless device.

20 Claims, 7 Drawing Sheets

(56) References Cited

U.S. PATENT DOCUMENTS

| | | | |
|---|---|---|---|
| 2013/0107824 A1* | 5/2013 | Cherian | H04W 76/11 |
| | | | 370/329 |
| 2015/0063205 A1 | 3/2015 | Elliott | |
| 2015/0163656 A1* | 6/2015 | Son | H04L 61/2521 |
| | | | 370/338 |
| 2016/0302058 A1 | 10/2016 | Mestanov et al. | |
| 2018/0077742 A1 | 3/2018 | Pang | |
| 2018/0288612 A1* | 10/2018 | Mathur | H04W 12/02 |
| 2018/0324142 A1 | 11/2018 | Adrangi et al. | |
| 2019/0037595 A1* | 1/2019 | Cherian | H04W 74/08 |
| 2019/0386955 A1 | 12/2019 | Weis et al. | |
| 2020/0244655 A1 | 7/2020 | Gundavelli et al. | |
| 2020/0351648 A1 | 11/2020 | Fang | |
| 2021/0014679 A1* | 1/2021 | Liu | H04W 12/50 |
| 2021/0036988 A1 | 2/2021 | McKibben et al. | |
| 2021/0144239 A1* | 5/2021 | Barton | H04L 61/50 |
| 2021/0144589 A1* | 5/2021 | Seok | H04W 28/065 |
| 2021/0266735 A1 | 8/2021 | Hu et al. | |
| 2021/0360465 A1 | 11/2021 | Henry et al. | |
| 2022/0095206 A1* | 3/2022 | Vakil | H04W 72/21 |
| 2022/0417063 A1* | 12/2022 | Yan | H04B 7/0626 |
| 2023/0043950 A1* | 2/2023 | Wang | H04L 63/0421 |
| 2023/0089319 A1* | 3/2023 | Kneckt | H04W 12/037 |
| 2023/0209336 A1* | 6/2023 | Gauvreau | H04W 12/06 |
| | | | 726/6 |
| 2023/0269222 A1* | 8/2023 | Wu | H04L 61/5038 |
| | | | 370/254 |
| 2023/0269788 A1* | 8/2023 | Xia | H04W 74/0866 |
| | | | 370/329 |
| 2023/0283440 A1* | 9/2023 | Huang | H04L 5/0055 |
| | | | 370/329 |

OTHER PUBLICATIONS

Marks, "IEEE Std 802c: What's New and Useful in the Overview and Architecture," IEEE 802.1 Contribution, Sep. 2017, 42 pages.

Slashdot, "Did MacOS Stop Allowing Changes to Wifi MAC Addresses?," https://mobile.slashdot.org/story/19/10/06/177216/did-macos-stop-allowing-changes-to-wifi-mac-addresses, Apr. 5, 2021, 8 pages.

Volz, et al., "Link-Layer Addresses Assignment Mechanism for DHCPv6," draft-bvtm-dhc-mac-assign-02, Dynamic lost Configuration (DHC), Internet-Draft, Oct. 20, 2018, 18 pages.

Lee, et al., "Problem Statements for MAC Address Randomization," draft-lee-randomized-macaddr-ps-01 Internet Engineering Task Force, Internet-Draft, Sep. 22, 2020, 6 pages.

Ansley, "IEEE P802.11—Randomized and Changing MAC Address (RCM) Study Group (SG)—Meeting Update," https://www.ieee802.org/11/Reports/rcmtig_update.htm, Apr. 5, 2021, 2 pages.

Stretch, "MAC Address Aggregation and Translation as an Alternative to L2 Overlays," https://packetlife.net/blog/2014/nov/18/mac-address-aggregation-and-translation/, Nov. 18, 2014, 9 pages.

Wang, et al., "MAC Address Translation for Enabling Scalable Virtual Private LAN Services?," 21st International Conference on Advanced Information Networking and Applications Workshops (AINAW'07), May 2007, 6 pages.

Android Open Source Project, "Privacy: MAC Randomization," retrieved from https://source.android.com/devices/tech/connect/wifi-mac-randomization, on Dec. 4, 2020, 4 pages.

Bellovin et al., "Privacy-Enhanced Searches Using Encrypted Bloom Filters," Columbia University Computer Science Technical Reports, CUCS-034-07, Apr. 27, 2011, 16 pages.

Razaque, et al., "Restoring the privacy and confidentiality of users over Mobile collaborative learning (MCL) environment," IEEE Transaction Latin America, vol. 9, No. 7, Dec. 2011, 13 pages.

Alibaba Cloud, "The principle of Arp-nat (MAC Address translation)," https://topic.alibabacloud.com/a/the-principle-of-arp-nat-mac-address-translation_8_8_30147619.html, Nov. 2017, 7 pages.

Wi-Fi Alliance, "WPA3™ Specification," Version 3, WPA3™ Specification Version 3.0, https://www.wi-fi.org/file/wpa3-specification, Dec. 20, 2019, 30 pages.

J. Henry, et al., "Randomized and Changing MAC Address Use Cases draft-henry-madinas-framework-03," Internet Engineering Task Force, Internet-Draft, Intended status: Informational, Oct. 24, 2021, 15 pages.

\* cited by examiner

WIRELESS CLIENT MEDIA ACCESS CONTROL (MAC) ADDRESS COLLISION AVOIDANCE

TECHNICAL FIELD

The present disclosure relates to wireless networking.

BACKGROUND

Wireless devices wireless associate to access points of a wireless network to gain access to the network infrastructure. In some wireless networks, wireless devices gain access to the network infrastructure through different access points that are coordinated by a network controller. The wireless devices and network infrastructure typically use Media Access Control (MAC) hardware addresses to direct network messages (e.g., frames) to the proper devices.

Some wireless devices may use a random or rotating MAC address to account for issues of privacy and tracking the wireless device. Changing MAC addresses provides an opportunity for two devices on the network to randomly choose the same MAC address, resulting in a MAC collision that prevents proper network communications. If a MAC collision occurs with a critical application or infrastructure, the wireless devices with the same MAC address are no longer able to communicate correctly in the network.

DESCRIPTION OF EXAMPLE EMBODIMENTS

Overview

Figure 1:
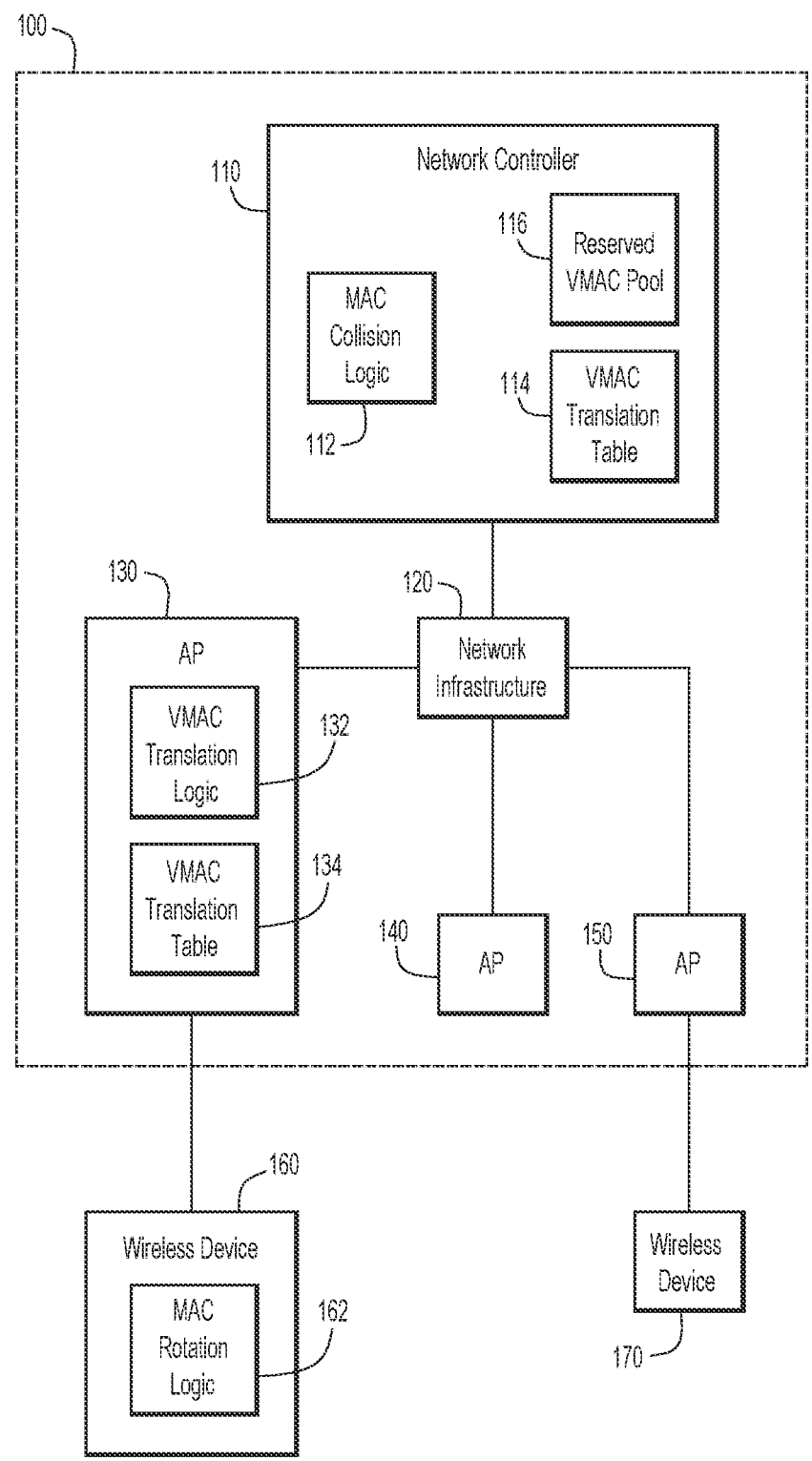
FIG. 1 is simplified block diagram of a wireless network system configured to avoid Media Access Control (MAC) address collisions, according to an example embodiment.

A method is provided for minimizing MAC address collisions in a wireless network. The method includes receiving an association request at a first access point from a first wireless device. The association request identifies a first MAC address of the first wireless device. The method also includes determining whether a second wireless device is associated with the wireless network using the first MAC address. Responsive to a determination that the second wireless device is associated with a second access point of the wireless network, the method includes obtaining a virtual MAC address for the first wireless device. The method further includes translating between the first MAC address and the virtual MAC address for network traffic of the first wireless device.

Example Embodiments

Since most Media Access Control (MAC) addresses contain 48 bits, MAC address collisions are typically rare. However, certain conditions may increase the likelihood of MAC collisions. For instance, the client driver of a wireless device, which selects the MAC address of the wireless device, may not select a truly random MAC address. Constraints on the MAC address (e.g., reserved bits to indicate unicast/multicast/broadcast frames or vendor-assigned ranges of MAC addresses) may limit the subset of the possible 48 bits available for the MAC address space. Over time, on large wireless networks, the number of wireless devices provides a distinct possibility that MAC collisions will occur, causing communication failure. The techniques presented herein monitor and manage the MAC addresses of the clients of a wireless network infrastructure to ensure that MAC address collisions do not disrupt communication on the wireless network.

If a wireless device randomly selects a MAC address that is already in use by another wireless device on the Wireless Local Area Network (WLAN), then the access point has the first opportunity to detect and mitigate the duplicate MAC address. When a wireless device attaches to an access point using a MAC address (e.g., a randomly determined MAC address), the access point queries the network controller to determine if any other wireless device is using that MAC address. The Wireless LAN Controller (WLC) may check a local database, query other network controllers, and/or launch a query to the local network (e.g., an inverse Address Resolution Protocol (ARP) query) to determine whether the newly joined MAC address is already in use by another device. Typically, if the network controller determines that the new MAC address is already in use, the network controller directs the access point to send a request to the wireless device to change to a different MAC address.

However, some wireless devices may not accept the request to change MAC addresses, and the access point may allow the wireless device to continue using the same MAC address on the given radio channel, unless another wireless device is associated with the same access point with the same MAC address. Having multiple wireless devices attached to the same access point using the same MAC address is significantly more rare than having multiple devices using the same MAC address across the entire WLAN, which may include several access points. In the unlikely event that multiple wireless devices are attached to the same access point using the same MAC address, the access point may force the wireless device to disassociate from the access point to prevent MAC address collisions between the wireless devices associated with the same access point. The disassociation/re-association process will typically force the wireless device to select a new MAC address, or force the wireless device to attach to (i.e., associate with) a different access point of the WLAN. Alternatively, the access point may issue an IEEE 802.11v message to the wireless device to push the wireless device to another access point on which there is no overlapping MAC address.

For cases in which a wireless device joins with a MAC address that is already in use on the WLAN, but not by another device attached to the same access point, the access point prevents a MAC collision with the MAC address of the wireless device by using a Virtual MAC (VMAC) address to represent the wireless device and avoid a MAC collision with any other clients with Layer 2 visibility on the same network controller. In one example, the VMAC address is provided by a central entity, such as a network controller, that has visibility into the MAC addresses being used on the WLAN.

Referring now to FIG. 1, a simplified block diagram illustrates a system for preventing MAC address collisions in a wireless network 100. The wireless network 100 includes a network controller 110 that is configured to manage the network elements of the wireless network 100 to service any devices communicating through the wireless network 100. The network controller 110 includes MAC collision logic 112 that enables the network controller 110 to monitor and avoid MAC address collisions throughout the wireless network 100. The network controller 110 also includes a Virtual MAC (VMAC) address translation table 114 that stores translation entries associating MAC addresses selected by wireless devices and VMAC addresses used to avoid MAC address collisions, as described herein. The network controller 110 may also include a reserved VMAC pool 116 of VMAC addresses that may be used temporarily to avoid MAC address collisions on the wireless network 100.

The wireless network 100 also includes a network infrastructure 120, which may include network elements (e.g., switches, routers, gateways, etc.) and/or computing elements (e.g., servers). The wireless network 100 also includes an access point (AP) 130 to connect one or more wireless devices to the network infrastructure 120. The AP 130 includes VMAC translation logic 132 and VMAC translation table 134. The VMAC translation logic 132 enables the AP 130 to translate between a VMAC and a potentially duplicated MAC address of an attached wireless device. The wireless network 100 also includes AP 140 and AP 150 to connect wireless devices to the network infrastructure 120. The AP 140 and the AP 150 may be configured similarly to the AP 130, for instance, with VMAC translation logic similar to VMAC translation logic 132 and a VMAC translation table similar to VMAC translation table 134.

A wireless device 160 connects to the wireless network 100 through the AP 130. The wireless device 160 includes MAC rotation logic 162 that enables the wireless device 160 to change/rotate a MAC address on a random or pseudo-random basis. Another wireless device 170 connects to the wireless network 100 through the AP 150. The wireless device 170 may include MAC rotation logic similar to that of wireless device 160.

In one example, the wireless network may include more than three APs (i.e., APs 130, 140, and 150) to provide network coverage to different spatial regions. The different spatial regions covered by the APs may overlap with each other to provide seamless coverage through migration of wireless devices (e.g., wireless device 160 and/or wireless device 170) as the wireless devices move in and out of coverage areas of different APs.

In another example, more than two wireless devices (e.g., wireless device 160 and wireless device 170) may be connected to the wireless network 100. For instance, multiple wireless devices may be attached to each of the APs (e.g., AP 130, AP 140, and AP 150) to access the wireless network 100.

To translate between a potentially conflicting MAC address selected by a wireless device (e.g., wireless device 160 or wireless device 170), the AP connecting each wireless device to the wireless network 100 queries the network controller 110 for each MAC address that a connected wireless device selects. The network controller 110 has full Layer 2 client visibility on the network infrastructure 120 and is able to allocate a non-colliding VMAC address in the event that the MAC address selected by any wireless device client is duplicated by another connected device. On receiving a response from the network controller 110, the AP inserts a translation entry into a Layer 2 translation table mapping the non-colliding VMAC address to the potentially colliding MAC address selected by the wireless device.

The AP performs Layer 2 MAC address translation for subsequent client traffic of the wireless device to allow the wireless device to maintain the selected MAC address while using the VMAC address to prevent the selected MAC address from colliding with another device using the same MAC address on the wireless network 100. For instance, the AP translates the source MAC address for uplink data from the MAC address selected by the wireless device to the VMAC address provided by the network controller 110. Similarly, the AP translates the destination MAC address for downlink data from the VMAC address to the original MAC address selected by the wireless device.

The Layer 2 translation between the VMAC address and the MAC address selected by the wireless device occurs at the edge of the wireless network 100, i.e., at the AP providing network access to the wireless device. The use of centrally allocated VMAC addresses to identify clients beyond the associating APs prevents MAC address collisions in the wireless network 100.

In one example, the network controller 110 identifies that traffic from a client (e.g., wireless device 160) uses an allocated VMAC address, and may reserve this VMAC address for that client, regardless of future MAC address rotations by the client. In other words, if a wireless device selects a different MAC address, the network controller 110 may detect the new MAC address for the client and allocate the same VMAC address (e.g., by updating the translation entry at the AP to associate the new MAC address with the previously allocated VMAC address). The network controller 110 may store the new MAC address selected by the wireless device, but as a secondary MAC address associated with the VMAC address that is used on the network infrastructure 120.

In another example, when a wireless device roams between APs, the network controller 110 may maintain the mapping/association of the device selected MAC address and VMAC address. For instance, the network controller 110 may provide a translation entry to the new AP for a roaming wireless device. The translation entry associates the MAC address of the roaming wireless device with the VMAC address allocated by the network controller 110, enabling the new AP to translate between the MAC address and the VMAC address. In the rare case in which a roaming wireless device has selected a MAC address that is already in use on the destination AP by another wireless device, the roaming wireless device may cause a MAC address collision and communication failure. In this instance, the new AP may prevent the roaming wireless device from attaching to the new AP.

Figure 2:
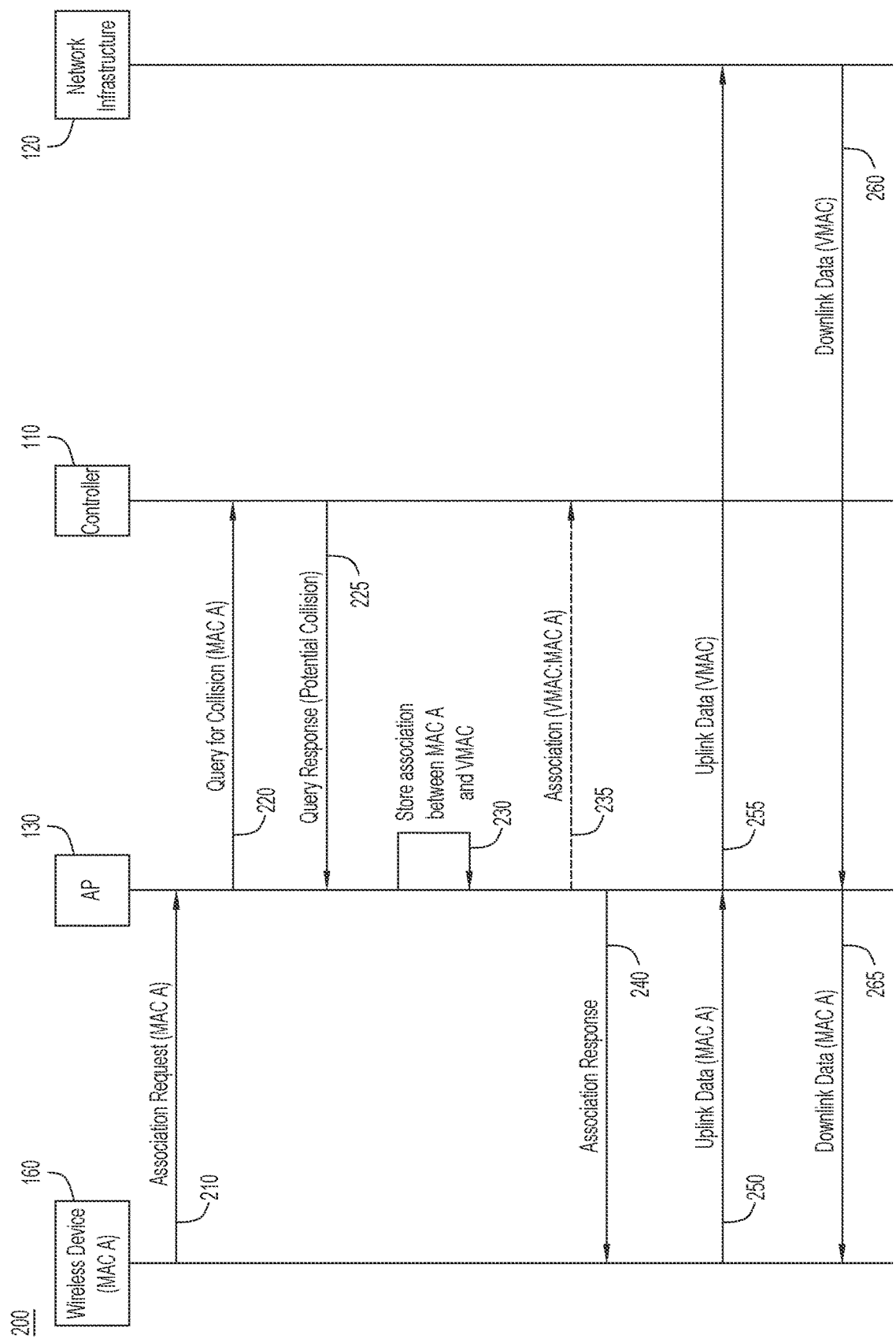
FIG. 2 is a message flow diagram illustrating an access point translating between a MAC address of a wireless device and a Virtual MAC (VMAC) address, according to an example embodiment.

Referring now to FIG. 2, a message flow diagram 200 is shown that depicts how the AP 130 translates MAC addresses for the wireless device 160 if the wireless device 160 associates to the AP 130 with a MAC address that presents a potential MAC address collision on the network infrastructure 120. The wireless device 160 sends an association request 210 to the AP 130 to attach to the AP 130. The association request 210 includes a MAC address (e.g., MAC A) selected by the wireless device to communicate on the wireless network 100 through the AP 130. In one example, the wireless device 160 may have rotated the selected MAC address to a new MAC address, for instance, to protect the privacy of the wireless device 160.

The AP 130 sends a query 220 to the network controller 110 to determine whether the MAC address (e.g., MAC A) selected by the wireless device 160 presents the possibility of a MAC address collision on the wireless network 100. The network controller 110 proves a query response 225 indicating that another device is using the same MAC address (e.g., MAC A), which may result in a MAC address collision. In one example, the AP 130 may determine that none of the other wireless devices (not shown) attached/associated to the AP 130 are using the same MAC address before sending the query 220 to the network controller to determine whether another wireless device attached to a separate or different AP is using the same MAC address.

In response to receiving the query response 225 indicating a potential MAC collision, the AP 130 stores a translation entry 230 associating the MAC address selected by the wireless device 160 (e.g., MAC A) and a VMAC address. In one example, the AP 130 may generate the VMAC address or select the VMAC from a pool of available VMAC addresses. Alternatively, the network controller 110 may designate (e.g., in the query response 225) an available VMAC address for use by the wireless device 160. Optionally, the AP 130 may provide a copy 235 of the translation entry 230 to the network controller 110 to ensure that the network controller 110 maintains visibility into the MAC addresses of all of the clients using the wireless network 100.

The AP 130 sends an association response 240 to the wireless device 160 to complete the attachment of the wireless device 160 to the AP 130. After associating with the AP 130, the wireless device 160 begins sending uplink data 250 to the AP 130 using the MAC address that the wireless device 160 selected (e.g., MAC A). Based on the stored translation entry 230, the AP 130 translates the source MAC address (e.g., MAC A) of the uplink data 255 to the VMAC address associated with the MAC address and sends the uplink data 255 to the network infrastructure 120 using the VMAC address. Similarly, when the network infrastructure 120 sends downlink data 260 using the VMAC address stored in the translation entry 230, the AP 130 translates the VMAC to the MAC address selected by the wireless device 160 and sends the downlink data 265 to the wireless device 160 using the MAC address (e.g., MAC A).

Figure 3:
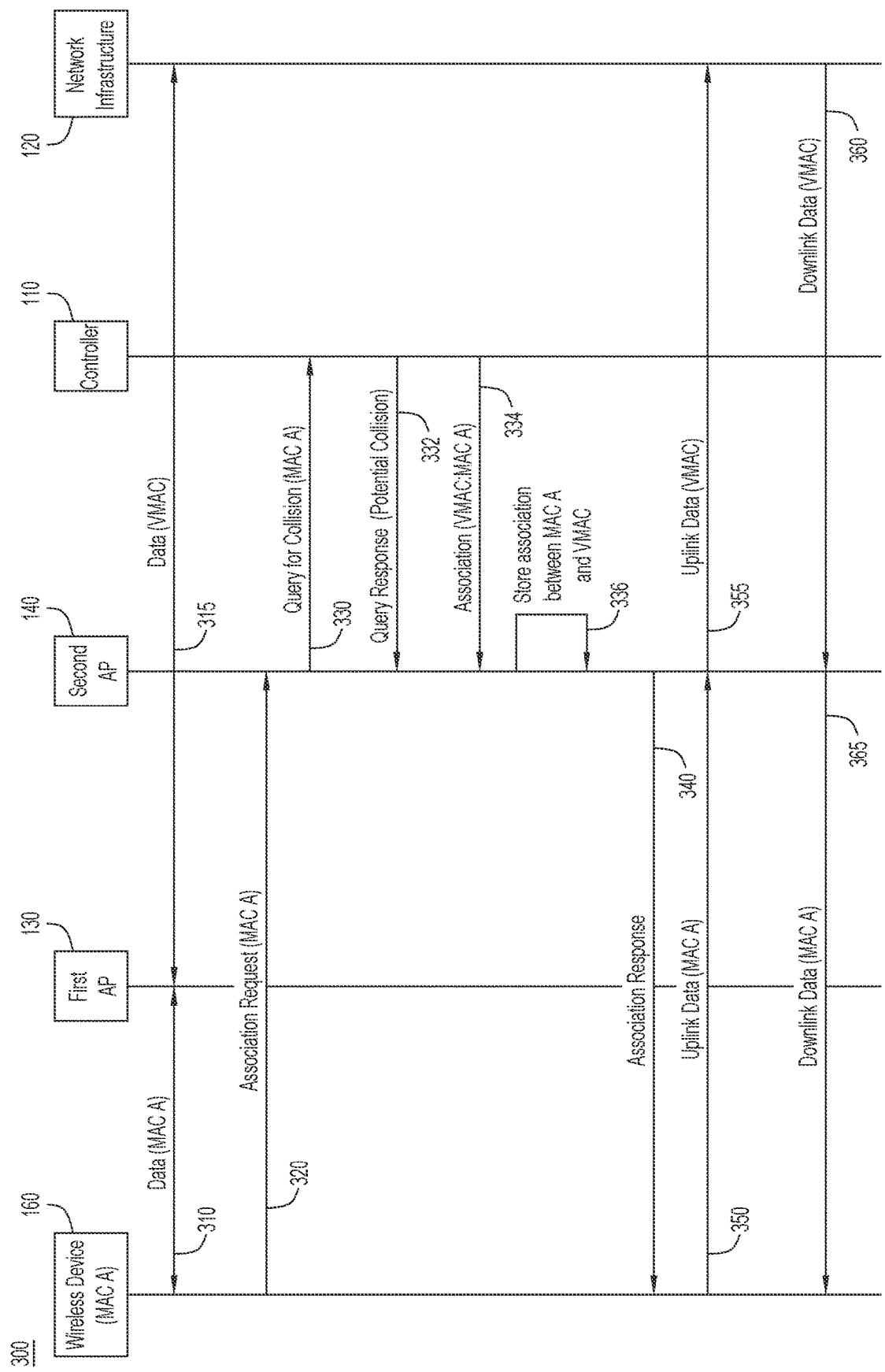
FIG. 3 is a message flow diagram illustrating a wireless device migrating to a second access point and maintaining the same VMAC address, according to an example embodiment.

Referring now to FIG. 3, a message flow diagram 300 illustrates a wireless device 160 roaming from a first AP (e.g., AP 130) to a second AP (e.g., AP 140) while maintaining the same VMAC address allocated by the network controller 110. Initially, the first AP 130 translates data 310, which uses the MAC address selected by the wireless device 160 (e.g., MAC A), and data 315, which uses the VMAC address allocated by the network controller 110. When the wireless device 160 roams to the second AP 140 (e.g., because the second AP 140 provides a stronger wireless signal, or to load balance between APs), the wireless device 160 sends an association request 320 to the second AP 140. The association request 320 includes the MAC address selected by the wireless device 160.

In a process similar to the process depicted in FIG. 2, the second AP 140 sends a query 330 to the network controller 110. The query 330 identifies the MAC address selected by the wireless device 160 (e.g., MAC A), which the network controller 110 determines is in use by another device on the wireless network 100. For instance, the MAC address MAC A may be used by a device that is attached to a third AP (not shown). The network controller 110 sends a query response 332 to the second AP 140 indicating that the MAC address selected by the wireless device 160 may collide with an existing device on the wireless network 100. The network controller 110 also sends an association 334 with the VMAC allocated by the network controller 110 to the second AP 140. In one example, the association 334 may be a translation entry that maps the MAC address selected by the wireless device 160 to the VMAC address previously allocated by the network controller 110. The second AP 140 stores the association 334 (e.g., the translation entry) in a translation table at 336.

The second AP 140 sends an association response 340 to the wireless device 160 to complete the association of the wireless device 160 to the second AP 140, which may complete the roaming process by dropping the association with the first AP 130 (not shown). With the wireless device 160 now connected to the wireless network 100 through the second AP 140, the wireless device 160 sends uplink data 350 to the second AP 140 using the MAC address selected by the wireless device 160 (e.g., MAC A). The second AP 140 translates the MAC address of the wireless device 160 to the VMAC address allocated by the network controller 110 and forwards the uplink data 355 to the network infrastructure 120 using the VMAC address. Similarly, the second AP 140 translates the VMAC address in the downlink data 360 to the MAC address of the wireless device 160 (e.g., MAC A) and forwards the downlink data 365 using the MAC address selected by the wireless device 160.

Figure 4:
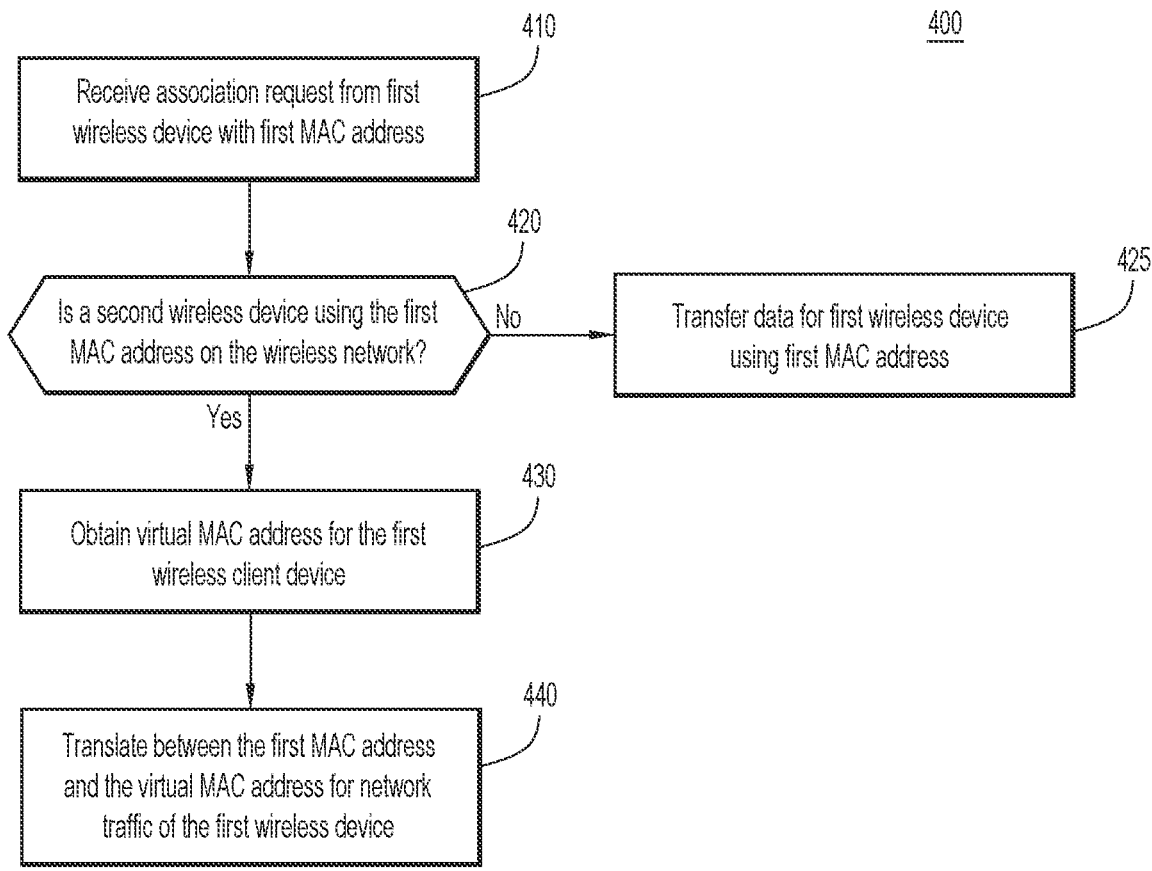
FIG. 4 is a flowchart illustrating operations performed by an access point to translate between a MAC address of a wireless device and a VMAC address for network traffic of the wireless device, according to an example embodiment.

Referring now to FIG. 4, a flowchart illustrates an example process 400 performed by an access point (e.g., AP 130) to prevent MAC address collisions in a wireless network. At 410, the access point receives an association request from a first wireless device. The association request identifies a first MAC address, which may be selected by the first wireless device. In one example, the first MAC address is periodically rotated to a pseudorandom MAC address to protect the privacy of the first wireless device.

At 420, the access point determines whether a second wireless device is already using the first MAC address on the wireless network. In one example, the access point may query a network controller of the wireless network to determine whether the second wireless device that is attached to a different access point uses the first MAC address. If there is no second wireless device using the first MAC address to cause a potential MAC collision, then the access point transfers data for the first wireless device using the first MAC address at 425.

If the access point determines that a second wireless device is already using the first MAC address, then the access point obtain a VMAC address for the first wireless device at 430. In one example, the network controller responds to a query from access point with an indication of a potential MAC collision and provides the VMAC address to prevent the MAC collision. In another example, the network controller may provide a translation entry mapping the first MAC address to the VMAC address. After the access point obtains the VMAC address for the first wireless device, the access point forwards network traffic for the first wireless device by translating between the first MAC address and the VMAC address at 440. In one example, the access point swaps out the first MAC address for the VMAC address in uplink traffic based on a Layer 2 translation table. Similarly, the access point swaps out the VMAC address for the first MAC address in downlink traffic for the first wireless device.

Figure 5:
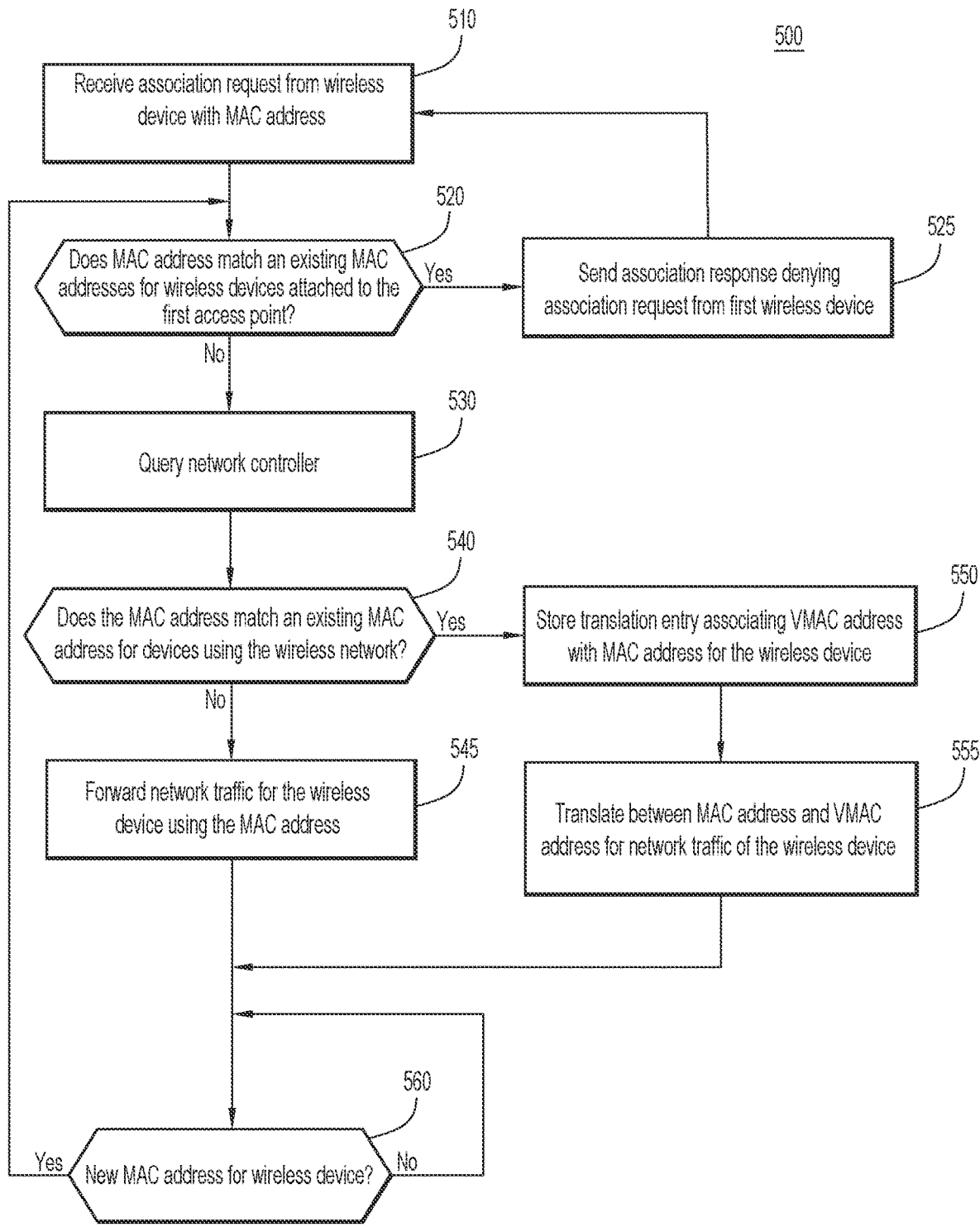
FIG. 5 is a flowchart illustrating operations performed by an access point to avoid MAC address collisions for an attached wireless device, according to an example embodiment.

Referring now to FIG. 5, a flowchart illustrates an example process 500 performed by a first access point (e.g., AP 130) to coordinate with a network controller (e.g., network controller 110) to prevent MAC collisions in a wireless network with multiple access points. At 510, the access point receives an association request from a wireless device with a MAC address. In one example, the access point may receive the association request from a wireless device that roams into the coverage range of the access point. In another example, the first access point may receive the association request when the wireless devices rotates its MAC address and selects a different, pseudorandom MAC address.

At 520, the first access point determines whether the MAC address provided in the association request matches an existing MAC address for another wireless device attached to the first access point. Another wireless device using the same MAC address on the same access point would lead to a MAC collision in the radio channel, which the first access point prevents at 525 by sending an association response denying the association request for the wireless device. Alternatively, the access point may refrain from responding to the association request by the wireless device, causing the wireless device to drop the unacknowledged association request. After the failed association request with the original MAC address, the wireless device may change MAC addresses and try to send another association request at 510.

If the first access point does not serve a previously attached wireless device with the same MAC address as the association request, as determined at 520, then the first access point queries a network controller at 530 to determine whether the MAC address is used by another wireless device that is not attached to the first access point. At 540, the access point determines whether the MAC address from the association request matches an existing MAC address for any devices in the wireless network. In one example, the network controller provides a notification to the first access point identifying whether the MAC address matches an existing MAC address in use by another wireless device at another access point. At 545, if the MAC address does not match an existing MAC address in use on any access point of the wireless network, then the first access point forwards network traffic for the wireless device using the MAC address provided in the association request.

If the MAC address provided by the wireless device in the association request does match an existing MAC address in use on the wireless network, then the first access point stores a translation entry for the wireless device at 550. The translation entry associates the MAC address provided by the wireless device and a VMAC address. In one example, the network controller provides the VMAC address in a response to the query identifying the MAC address. Additionally, the network controller may provide a translation entry to the first access point associating the MAC address with the VMAC address for the wireless device. At 555, the first access point forwards network traffic for the wireless device by translating between the MAC address and the VMAC address. In one example, the first access point swaps out the MAC address for the VMAC address in uplink traffic based on a Layer 2 translation table. Similarly, the first access point swaps out the VMAC address for the MAC address in downlink traffic for the wireless device.

If the wireless device subsequently changes MAC addresses, as determined at 560, then the process 500 restarts with the new MAC address to determine if the new MAC address may cause a MAC collision. If the wireless device does not change MAC addresses, the first access point may continue to provide network traffic to the wireless device with either the MAC address or the VMAC address, depending on the determination at 540.

In one example, the first access point may receive a notification from the network controller indicating that the MAC address is no longer in use by another wireless device. In this example, the first access point may stop translating between the VMAC address and the MAC address, since there is no longer any potential for a MAC collision. Alternatively, the first access point may continue to translate between the VMAC address and the MAC address. If the first access point stops translating between the VMAC address and the MAC address, the first access point may notify the network controller and return the VMAC address to a pool of available VMAC addresses (e.g., reserved VMAC pool 116 shown in FIG. 1).

Figure 6:
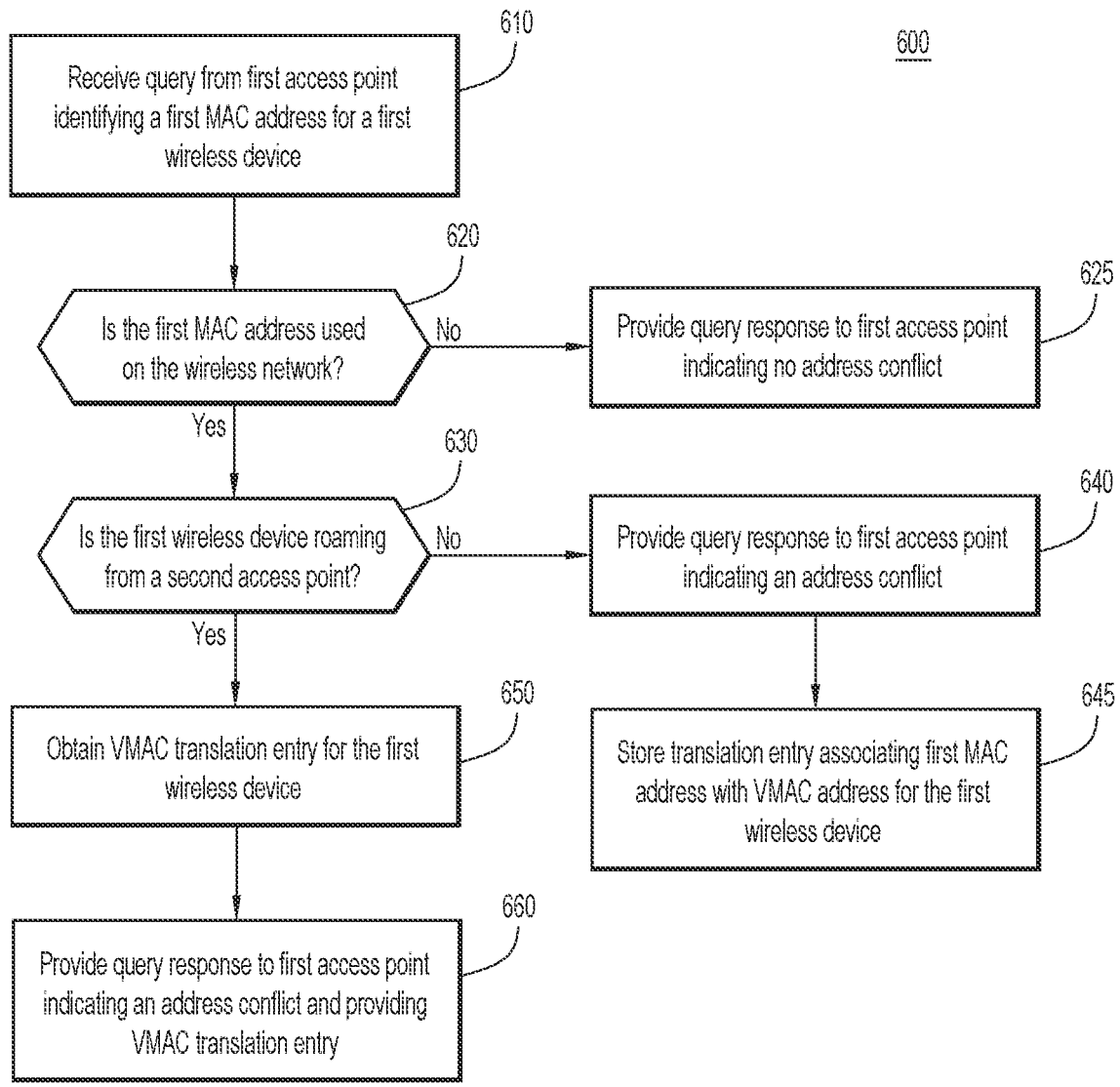
FIG. 6 is a flowchart illustrating operations performed by a network controller to avoid MAC address collisions on a wireless network, according to an example embodiment.

Referring now to FIG. 6, a flowchart illustrates an example process 600 performed by a network controller (e.g., network controller 110) to prevent MAC collisions in a wireless network. At 610, the network controller receives a query from a first access point identifying a first MAC address used by a first wireless device. The network controller determines whether the first MAC address is currently being used on the wireless network by another device at 620. If the first MAC address is not being used by another device on the wireless network, the network controller provides a query response to the first access point at 625. The query response indicates that the first MAC address does not present the potential for a MAC collision, and enables the first access point to provide network traffic to the first wireless device using the first MAC address.

If the network controller determines that the first MAC address is currently in use, then the network controller determines whether the first wireless device is roaming from a second access point at 630. If the first wireless device is not roaming from the second access point, then the network controller provides a query response indicating the potential for a MAC collision at 640. The query response includes a VMAC address and directs the first access point to translate network traffic for the first wireless device between the first MAC address and the VMAC address. At 645, the network controller stores a translation entry associating the first MAC address with the VMAC address for the first wireless device.

If the network controller determines that the first wireless device is roaming from the second access point, the network controller obtains a VMAC translation entry for the first wireless device at 650. The translation entry associates the first MAC address with the VMAC address that the second access point is currently using for network traffic associated with the first wireless device. At 660, the network controller provides the first access point with a query response that indicates the potential for a MAC collision. The query response also includes the VMAC translation entry associating the first MAC address with the VMAC address, enabling the first access point to translate between the first MAC address and the VMAC address for network traffic associated with the first wireless device.

Figure 7:
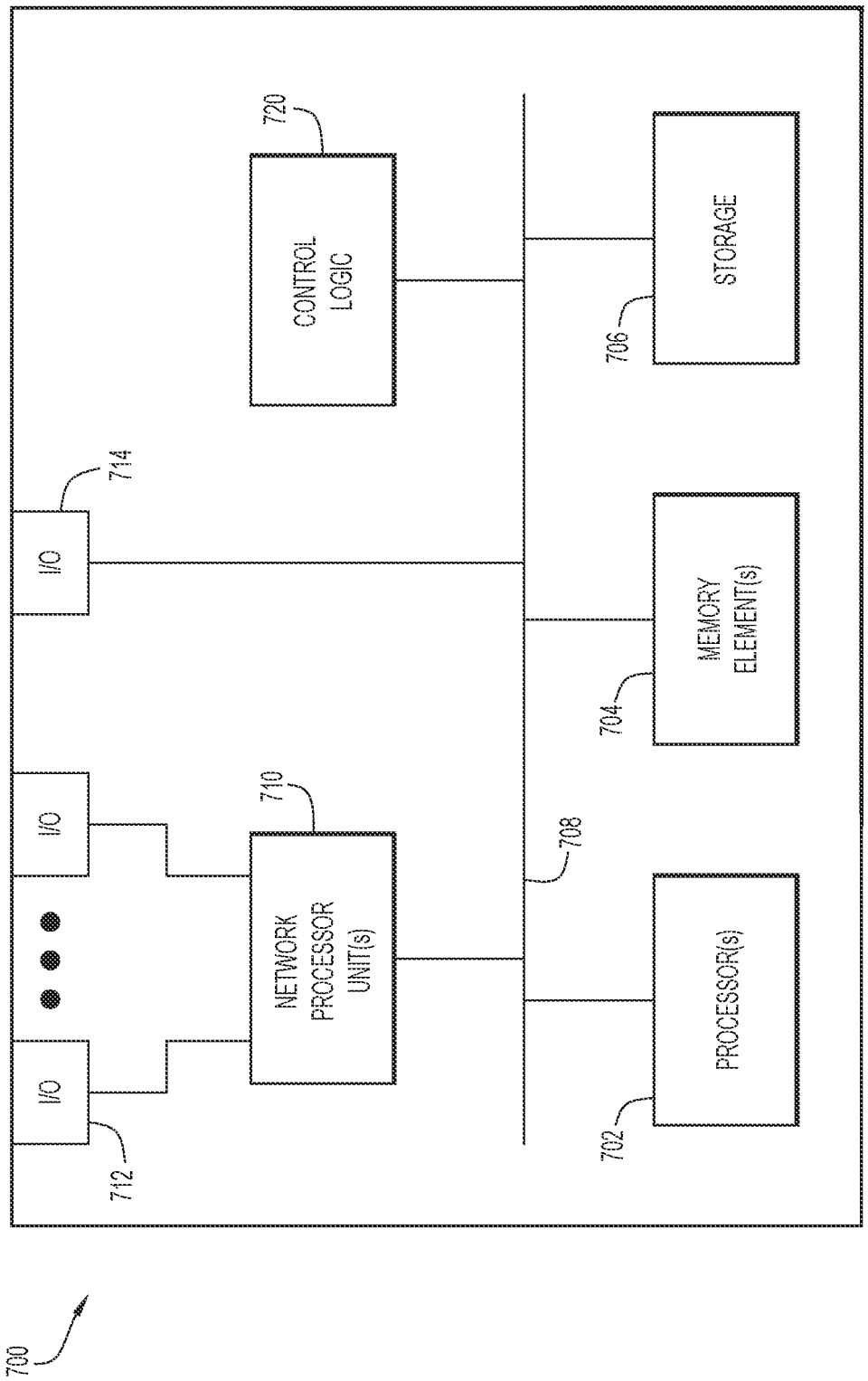
FIG. 7 is a block diagram of a computing device that may be configured to perform the techniques presented herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device, such as computing device 700 or any combination of computing devices 700, may be configured as any entity/entities as discussed for the techniques depicted in connection with FIGS. 1-6 in order to perform operations of the various techniques discussed herein.

In at least one embodiment, the computing device 700 may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory element(s) 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 (wired and/or wireless) to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interface(s) 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 720 can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein detect and avert MAC address collisions in wireless network, which may be caused by Randomized and Changing MAC (RCM) addresses used to protect the privacy of wireless devices. Though the chance of a 48-bit MAC address being randomly duplicated on a smaller network, the probability grows exponentially with the number of user devices in the network. Additionally, a wireless device may not be able to detect a duplicated RCM address if the device causing the conflict is not in the same cell, but in a different cell of the network that shares Layer 2 connectivity. For instance, individual access points in wireless networks with multiple access points, such as mesh networks, may not have information related to wireless devices that are attached to other access points.

The techniques presented herein ensure that the MAC addresses selected randomly by wireless client devices do not present a risk of MAC collision on the network infrastructure. The mechanism described herein is transparent to the wireless devices and do not require any configuration changes to the wireless devices. The access point and network controller handle any changes from the techniques described herein, and there is no need for a custom protocol or exchange with the individual wireless devices. Additionally, the changes to the network traffic are transparent to the network infrastructure. Further, the techniques presented herein enable roaming wireless devices to preserve their MAC address and network traffic across multiple access points. The techniques presented herein function in both flex switching mode and central switching mode.

In the techniques presented herein, wireless devices are not forced to change duplicate MAC addresses, since the VMAC address translation at the access point hides the duplicate MAC addresses and prevents MAC collisions on the larger network infrastructure. MAC collisions are contained to the radio medium, which reduces the collision domain to the number of devices attached to a single access point instead of the number of devices in the entire network. Radio collisions may be treated with separate techniques not described herein.

In some aspects, the techniques described herein relate to a method including: at a first access point of a wireless network, receiving an association request from a first wireless device, the association request identifying a first MAC address of the first wireless device; determining whether a second wireless device is associated with the wireless network using the first MAC address; responsive to a determination that the second wireless device is associated with a second access point of the wireless network, obtaining a virtual MAC address for the first wireless device; and translating between the first MAC address and the virtual MAC address for network traffic of the first wireless device.

In some aspects, the techniques described herein relate to a method, wherein determining whether the second wireless device is associated with the wireless network using the first MAC address includes querying a network controller configured to manage a plurality of access points including the first access point and the second access point.

In some aspects, the techniques described herein relate to a method, wherein obtaining the virtual MAC address includes receiving an indication of the virtual MAC address in response to querying the network controller.

In some aspects, the techniques described herein relate to a method, wherein translating includes: sending uplink data from the first wireless device to a network infrastructure of the wireless network using the virtual MAC address; and sending downlink data from the network infrastructure to the first wireless device using the first MAC address.

In some aspects, the techniques described herein relate to a method, further including sending an association response to the first wireless device, the association response confirming an association between the first wireless device and the first access point.

In some aspects, the techniques described herein relate to a method, further including storing a translation entry at the first access point, the translation entry associating the first wireless device with the first MAC address and the virtual MAC address.

In some aspects, the techniques described herein relate to an apparatus including: a wireless network interface configured to communicate with one or more wireless devices; a network infrastructure interface configured to communicate with a network infrastructure of a wireless network; and a processor coupled to the wireless network interface and the network infrastructure interface, the processor configured to: receive an association request from a first wireless device via the wireless network interface, the association request identifying a first MAC address of the first wireless device; determine whether a second wireless device is associated with the wireless network using the first MAC address; responsive to a determination that the second wireless device is associated with a separate access point of the wireless network, obtain a virtual MAC address for the first wireless device; and translate between the first MAC address and the virtual MAC address for network traffic of the first wireless device.

In some aspects, the techniques described herein relate to an apparatus, wherein the processor is configured to determine whether the second wireless device is associated with the wireless network using the first MAC address by querying a network controller configured to manage a plurality of access points including the apparatus and the second access point.

In some aspects, the techniques described herein relate to an apparatus, wherein the processor is configured to obtain the virtual MAC address by receiving an indication of the virtual MAC address via the network infrastructure interface in response to querying the network controller.

In some aspects, the techniques described herein relate to an apparatus, wherein the processor is configured to translate by: causing the network infrastructure interface to send uplink data from the first wireless device to the network infrastructure using the virtual MAC address; and causing the wireless network interface to send downlink data from the network infrastructure to the first wireless device using the first MAC address.

In some aspects, the techniques described herein relate to an apparatus, wherein the processor is further configured to cause the wireless network interface to send an association response to the first wireless device, the association response confirming an association between the apparatus and the first access point.

In some aspects, the techniques described herein relate to an apparatus, further including a memory, wherein the processor is configured to store a translation entry in the memory, the translation entry associating the first wireless device with the first MAC address and the virtual MAC address.

In some aspects, the techniques described herein relate to a system including: a network controller configured to manage a wireless network, the wireless network including a network infrastructure and a plurality of access points; and a first access point among the plurality of access points, the first access point configured to: receive an association request from a first wireless device, the association request identifying a first MAC address of the first wireless device; determine whether a second wireless device is associated with the wireless network using the first MAC address; responsive to a determination that the second wireless device is associated with a second access point among the plurality of access points, obtain a virtual MAC address for the first wireless device; and translate between the first MAC address and the virtual MAC address for network traffic of the first wireless device.

In some aspects, the techniques described herein relate to a system, wherein the first access point is configured to determine whether the second wireless device is associated with the wireless network using the first MAC address by querying the network controller.

In some aspects, the techniques described herein relate to a system, wherein the first access point is configured to obtain the virtual MAC address by receiving an indication of the virtual MAC address in response to querying the network controller.

In some aspects, the techniques described herein relate to a system, wherein the first access point is configured to translate by: sending uplink data from the first wireless device to the network infrastructure using the virtual MAC address; and sending downlink data from the network infrastructure to the first wireless device using the first MAC address.

In some aspects, the techniques described herein relate to a system, wherein the first access point is further configured to send an association response to the first wireless device, the association response confirming an association between the first wireless device and the first access point.

In some aspects, the techniques described herein relate to a system, wherein the first access point is further configured to store a translation entry associating the first wireless device with the first MAC address and the virtual MAC address.

In some aspects, the techniques described herein relate to a system, wherein the network controller is configured to transfer the translation entry to a second access point in response to the first wireless device associating with the second access point.

In some aspects, the techniques described herein relate to a system, wherein the network controller is further configured to store the translation entry.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a first access point of a wireless network, receiving an association request from a first wireless device, the association request identifying a first Media Access Control (MAC) address of the first wireless device;
determining whether a second wireless device is associated with the wireless network using the first MAC address;
responsive to a determination that the second wireless device is associated with a second access point of the wireless network, transmitting an association response to the first wireless device, the association response identifying the first MAC address;
obtaining a virtual MAC address for the first wireless device from a network controller of the wireless network; and
translating between the first MAC address and the virtual MAC address for network traffic of the first wireless device.

2. The method of claim 1, wherein determining whether the second wireless device is associated with the wireless network using the first MAC address comprises querying the network controller, wherein the network controller is configured to manage a plurality of access points including the first access point and the second access point.

3. The method of claim 2, wherein obtaining the virtual MAC address comprises receiving an indication of the virtual MAC address in response to querying the network controller.

4. The method of claim 1, wherein translating comprises:
sending uplink data from the first wireless device to a network infrastructure of the wireless network using the virtual MAC address; and
sending downlink data from the network infrastructure to the first wireless device using the first MAC address.

5. The method of claim 1, wherein transmitting the association response confirms an association between the first wireless device and the first access point.

6. The method of claim 1, further comprising storing a translation entry at the first access point, the translation entry associating the first wireless device with the first MAC address and the virtual MAC address.

7. An apparatus comprising:
a wireless network interface configured to communicate with one or more wireless devices;
a network infrastructure interface configured to communicate with a network infrastructure of a wireless network; and a processor coupled to the wireless network interface and the network infrastructure interface, the processor configured to:
  receive an association request from a first wireless device via the wireless network interface, the association request identifying a first Media Access Control (MAC) address of the first wireless device;
  determine whether a second wireless device is associated with the wireless network using the first MAC address;
  responsive to a determination that the second wireless device is associated with a separate access point of the wireless network, cause the wireless network interface to transmit an association response to the first wireless device, the association response identifying the first MAC address;
  obtain a virtual MAC address for the first wireless device from a network controller of the wireless network via the network infrastructure interface; and
  translate between the first MAC address and the virtual MAC address for network traffic of the first wireless device.

8. The apparatus of claim 7, wherein the processor is configured to determine whether the second wireless device is associated with the wireless network using the first MAC address by querying the network controller, wherein the network controller is configured to manage a plurality of access points including the apparatus and the separate access point.

9. The apparatus of claim 8, wherein the processor is configured to obtain the virtual MAC address by receiving an indication of the virtual MAC address via the network infrastructure interface in response to querying the network controller.

10. The apparatus of claim 7, wherein the processor is configured to translate by:
  causing the network infrastructure interface to send uplink data from the first wireless device to the network infrastructure using the virtual MAC address; and
  causing the wireless network interface to send downlink data from the network infrastructure to the first wireless device using the first MAC address.

11. The apparatus of claim 7, wherein transmitting the association response with the wireless network interface confirms an association between the apparatus and the first wireless device.

12. The apparatus of claim 7, further comprising a memory, wherein the processor is configured to store a translation entry in the memory, the translation entry associating the first wireless device with the first MAC address and the virtual MAC address.

13. A system comprising:
  a network controller configured to manage a wireless network, the wireless network comprising a network infrastructure and a plurality of access points; and
  a first access point among the plurality of access points, the first access point configured to:
    receive an association request from a first wireless device, the association request identifying a first Media Access Control (MAC) address of the first wireless device;
    determine whether a second wireless device is associated with the wireless network using the first MAC address;
    responsive to a determination that the second wireless device is associated with a second access point among the plurality of access points, transmit an association response to the first wireless device, the association response identifying the first MAC address;
    obtain a virtual MAC address for the first wireless device from the network controller; and
    translate between the first MAC address and the virtual MAC address for network traffic of the first wireless device.

14. The system of claim 13, wherein the first access point is configured to determine whether the second wireless device is associated with the wireless network using the first MAC address by querying the network controller.

15. The system of claim 14, wherein the first access point is configured to obtain the virtual MAC address by receiving an indication of the virtual MAC address in response to querying the network controller.

16. The system of claim 13, wherein the first access point is configured to translate by:
  sending uplink data from the first wireless device to the network infrastructure using the virtual MAC address; and
  sending downlink data from the network infrastructure to the first wireless device using the first MAC address.

17. The system of claim 13, wherein transmitting the association response confirms an association between the first wireless device and the first access point.

18. The system of claim 13, wherein the first access point is further configured to store a translation entry associating the first wireless device with the first MAC address and the virtual MAC address.

19. The system of claim 18, wherein the network controller is configured to transfer the translation entry to a second access point in response to the first wireless device associating with the second access point.

20. The system of claim 18, wherein the network controller is further configured to store the translation entry.

* * * * *